H. KIBELE.
RELIEF VALVE FOR FIRELESS COOKERS.
APPLICATION FILED SEPT. 11, 1911.
1,117,399.
Patented Nov. 17, 1914.
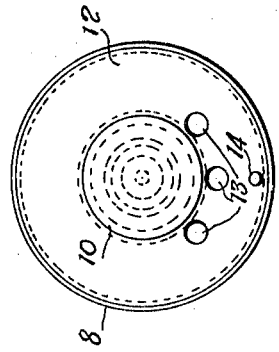
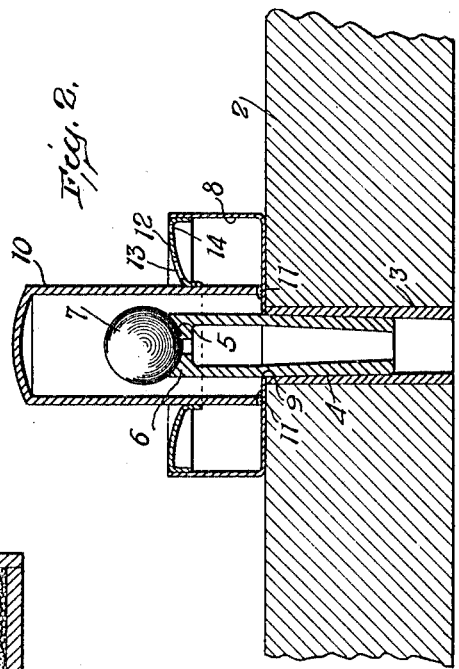
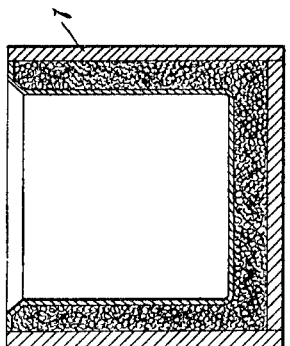
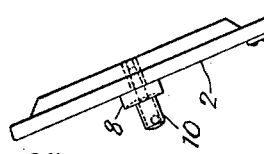
Witnesses
Howard Walmsley.
Harriet L. Hammaker.
Inventor
Hector Kibele,
By Toulmin & Reed.
Attorneys

UNITED STATES PATENT OFFICE.

HECTOR KIBELE, OF BLUFFTON, OHIO, ASSIGNOR TO THE DILLER MANUFACTURING COMPANY, OF BLUFFTON, OHIO, A CORPORATION OF OHIO.

RELIEF-VALVE FOR FIRELESS COOKERS.

1,117,399.   Specification of Letters Patent.   Patented Nov. 17, 1914.

Application filed September 11, 1911. Serial No. 648,755.

*To all whom it may concern:*

Be it known that I, HECTOR KIBELE, a citizen of the United States, residing at Bluffton, in the county of Allen and State of Ohio, have invented certain new and useful Improvements in Relief-Valves for Fireless Cookers, of which the following is a specification, reference being had therein to the accompanying drawing.

This invention relates to fireless cookers and more particularly to means for relieving and disposing of the surplus steam generated in such cookers.

Particularly in that type of cooker which employs the heat-retaining devices or radiators considerable quantities of surplus steam are generated and it is desirable that some means be provided to relieve the pressure within the cooker caused by the accumulation of this steam.

To this end it is an object of the invention to provide a relief valve which will permit the escape of the proper quantities of steam and will be of such a simple construction that it will not become disarranged or rendered inoperative in the course of its ordinary use.

It is a further object to provide means for condensing the steam escaping about the valve and delivering the water of condensation to a suitable receptacle, thereby preventing either the water or the steam escaping into the room.

Further, it is an object of the invention to so construct and arrange the device that it may be mounted upon the hinged lid of the cooker and, when the lid is raised, the water will not escape from the receptacle and the valve will not be so disarranged that it will not return to its normal position when the lid is closed.

It is a further object of the invention to so construct the device that it can be produced at a low cost and will be of a very durable character, there being no parts which will wear out.

In the accompanying drawings, Figure 1 is a vertical, sectional view of a cooker embodying my invention; Fig. 2 is a vertical section taken centrally through the device as a whole; and Fig. 3 is a top plan view of the device.

In these drawings I have illustrated one embodiment of the invention and have shown the same as applied to a fireless cooker comprising a body portion or food receptacle 1 having hinged thereto the usual lid or hinged closure 2. Preferably, the relief port is formed in the lid, although it may be formed in other parts of the cooker. As here shown the relief port is provided with a metal bushing 3 within which fits the lower portion of a tube 4. The fit between the tube 4 and the bushing 3 is a friction fit which will prevent the escape of steam but which will permit the tube to be readily removed. The tube 4 is normally closed by means of a suitable valve which will be automatically opened when the steam pressure within the cooker has reached a predetermined degree. In the present instance the outer end of the tube 4 is provided with a valve seat 5 which is formed by providing the outer end of the tube with an inwardly extending annular flange 6, the outer surface of which is concave to form a seat upon which the valve member may be seated, this valve member preferably comprising a ball 7. The weight of this ball is such that when the steam pressure within the cooker becomes excessive the ball will be lifted from its seat to permit the steam to escape through the tube 4 and about the valve.

To prevent the steam escaping into the room a suitable condenser is provided and so connected with the relief port as to receive the steam therefrom and a suitable receptacle is provided to receive the water of condensation from the condenser. In the construction here shown a receptacle 8 having a central opening 9 fits snugly about the tube 4 and preferably rests upon the lid 2 of the cooker. The tube fits the opening of the receptacle in such a manner as to secure the receptacle to the tube and permit the parts to be removed as a unit. Mounted about the outer end of the tube 4 is a cylindrical casing 10 supported upon the bottom of the receptacle 8. This casing is of a diameter greater than the diameter of the ball valve 7 and is of such a height that it will extend some distance beyond the end of the tube 4. The casing has two functions. It serves as a guide to return the ball valve to its seat when it has been displaced therefrom, the internal diameter of the casing being such that when the device is moved to a vertical position the ball will be moved by gravity to its seat on the end of the tube 4.

In addition to this function the casing constitutes a condensing chamber within which the steam escaping about the valve is condensed either in part or in whole. The water of condensation escapes from the condenser proper to the receptacle 8 through notches or passageways 11 formed at the bottom of the casing 10. The upper end of the receptacle 8 is closed by means of a collar 12 having inturned edges and of such a width that it will fit snugly between the circumferential wall of the receptacle and the casing 10, thus forming not only a snug closure for the receptacle but also forming a support for the casing 10, whereby the latter is retained in its proper position with relation to the tube and the valve. Any steam which may not be condensed within the casing 10 will escape through the openings 11 into the receptacle 8 and will be further condensed within this receptacle. Usually all the steam will be condensed but should any of it remain uncondensed after passing through the water it may escape to the atmosphere through an opening or openings 13 formed in the collar or closure 12. Preferably this closure slopes slightly from the wall of the receptacle 8 toward the wall of the casing 10 and any water of condensation which may collect upon the exterior of the closure will pass through the openings into the receptacle 8. When the device is placed in position on the hinged closure of the cooker it is preferably arranged with the openings 13 adjacent to that edge of the closure opposite the hinges. Consequently, when the closure is moved into its open position the water within the receptacle will not escape through the openings 13 but will be retained within the receptacle. To enable the receptacle to be emptied a small opening 14 is provided and is preferably arranged near the outer wall of the receptacle adjacent to the openings 13. By removing the device from the lid the water can be readily poured through this small opening. The opening 14 being much smaller than the openings 13 it will be apparent that no water will be forced out through this smaller opening.

The operation of the device will be clearly understood from the foregoing description and it will be apparent that I have provided a very simple, inexpensive relief valve which will be positive in its operation and which can not be readily disarranged or broken; that I have provided in connection with this relief valve a condensing chamber in which the escaping steam is condensed and the water of condensation delivered to a receptacle. Further, it will be apparent that while the construction of this receptacle is such that it can be readily emptied when desired, the water will not spill when the lid on which the device is mounted is moved into its open position.

While I have shown and described one embodiment of the invention it will be understood that this form is chosen for the purpose of illustration only and that I do not wish to be limited to the details of construction shown and described, for obvious modifications will occur to a person skilled in the art.

Having thus fully described my invention, what I claim as new and desire to secure by Letters Patent, is:—

1. In a fireless cooker, a valve-controlled tube communicating with the interior thereof, a casing inclosing the outer end of said tube and constituting a condenser, and a receptacle communicating with said casing to receive the products of condensation therefrom.

2. In a fireless cooker, a tube communicating with the interior thereof, a valve to control the passage of steam through said tube, a receptacle extending about said tube, a casing mounted about said tube, extending within said receptacle, communicating therewith and having its outer end closed, a collar fitting between the outer wall of said receptacle and said casing to form a closure for the former and having an opening therein.

3. In a fireless cooker, a tube communicating with the interior thereof, a valve to control the passage of steam through said tube, a receptacle extending about said tube, a casing mounted about said tube, extending within said receptacle, communicating therewith and having its outer end closed, a collar fitting snugly between the outer wall of said receptacle and said casing, sloping toward said casing and having a series of openings near said casing, and a smaller opening near the wall of the receptacle.

4. In a fireless cooker having a hinged lid, an outlet tube mounted in said lid and communicating with the interior of said cooker, a valve to control the passage of steam through said tube, a casing surrounding the outer end of said tube and constituting a condenser, a receptacle surrounding said casing and communicating therewith, a closure for said receptacle, an opening in said closure on that side of said casing opposite the hinged edge of said lid.

5. In a fireless cooker, a tube communicating with the interior of said cooker and having a valve seat at its outer end, a ball valve supported on said seat, a casing surrounding the end of said tube, spaced away therefrom and constituting both a guide for said ball valve and a condenser.

6. In a fireless cooker having a tiltable closure provided with a valve-controlled relief port, a casing inclosing said port and constituting a condenser, a receptacle mounted on said closure and communicating with said condenser, said receptacle having an outlet normally arranged in a position to prevent the escape of water therefrom when the closure is moved to its open position.

7. In a fireless cooker having a hinged closure provided with a valve-controlled relief port, a casing surrounding said relief port and constituting a condenser, a receptacle communicating with said casing, having its upper end closed and provided with outlet openings on that side thereof opposite the hinged edge of said closure, whereby when said closure is moved to its open position said opening will be on the high side of said receptacle.

8. In a fireless cooker having a hinged closure provided with an opening, a valve-controlled tube removably mounted in said opening, a casing surrounding the outer end of said tube and supported thereby, said casing constituting a condenser, a receptacle mounted on said tube, and communicating with said casing, and a closure for the outer end of said receptacle, said receptacle having an opening therein through which the water within the same may be discharged when said tube has been removed from said closure.

9. The combination, with a fireless cooker having a relief port, of a tube removably mounted in said port, a valve to control the flow of fluid through said tube, and a condenser coöperating with said tube and surrounding the outer end thereof.

10. The combination, with a fireless cooker having a relief port, of a tube removably mounted in said port, a valve to control the flow of fluid through said tube, a condenser coöperating with said tube and surrounding the outer end thereof, and a receptacle arranged about said condenser and communicating therewith to receive the products of condensation therefrom.

11. In a device of the character described, a tube, a valve to control the flow of steam through said tube, and a condenser surrounding the end of said tube and coöperating therewith to condense the steam which escapes about said valve.

12. In a device of the character described, a tube, a valve to control the flow of fluid through said tube, a receptacle communicating with said tube at a point removed from one end thereof, and a condenser secured to said receptacle and surrounding the end of said tube.

In testimony whereof, I affix my signature in presence of two witnesses.

HECTOR KIBELE.

Witnesses:
 HENRY L. ROMEY,
 BERTHA NICKLES.

Copies of this patent may be obtained for five cents each, by addressing the "Commissioner of Patents. Washington, D. C."